June 10, 1924.

C. MORZSA

SAW

Filed July 12, 1923

Inventor
C. Morzsa
By J. K. Bryant
Attorney

Patented June 10, 1924.

1,497,577

UNITED STATES PATENT OFFICE.

CHARLES MORZSA, OF BARNUM, WEST VIRGINIA.

SAW.

Application filed July 12, 1923. Serial No. 651,082.

*To all whom it may concern:*

Be it known that I, CHARLES MORZSA, a citizen of Hungary, residing at Barnum, in the county of Mineral and State of West Virginia, have invented certain new and useful Improvements in Saws, of which the following is a specification.

This invention relates to new and useful improvements in saws of a type best adapted for handling coal, stone, ice, etc.

An important object of the invention is to provide a saw of the reciprocating cross cut type which is suitably constructed to prevent lateral bending or warping while being operated.

A further object of the invention is the provision of a saw that will form an exceptionally broad kerf without necessitating the use of teeth having broad cutting surfaces extending transversely of the longitudinal axis of the saw and performing substantially a planing action when cutting.

Other objects and advantages of the invention will be apparent during the course of the following description.

Figure 1:
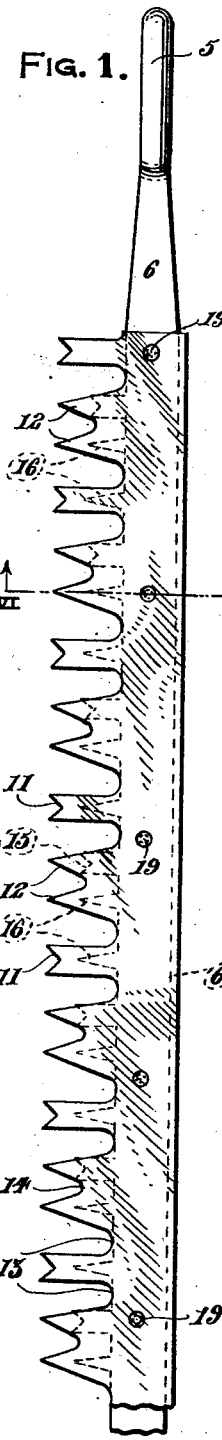
Figure 2:
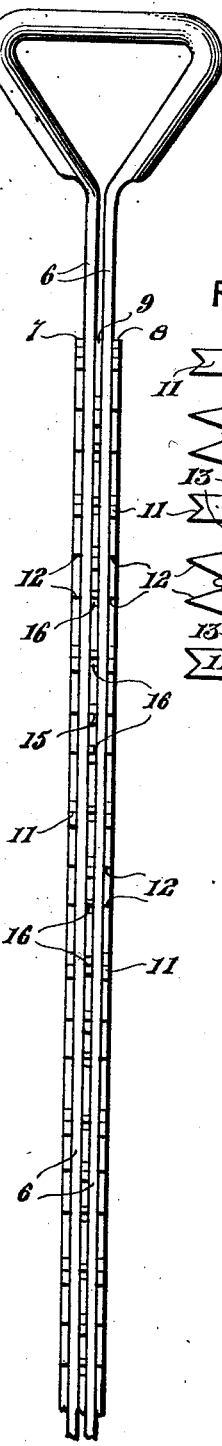
Figure 5:
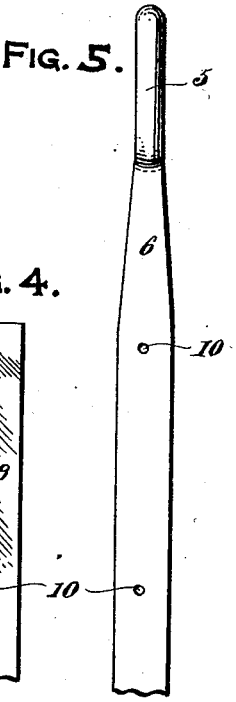
Figures 3, 4:
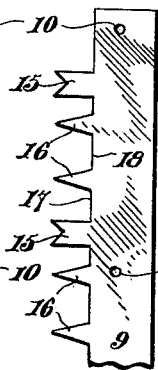
Figure 6:
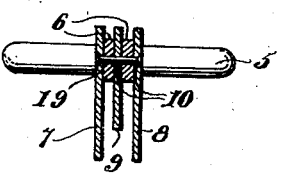
Figure 7:
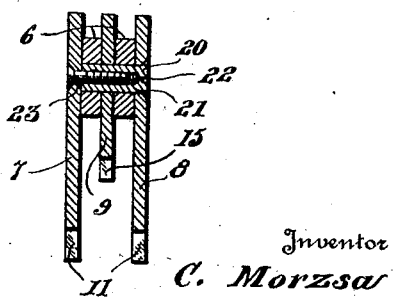

In the accompanying drawing forming a part of this specification and in which like numerals are employed to designate like parts throughout the same, Figure 1 is a side elevational view of a fragmentary portion of the saw embodying this invention, Figure 2 is an elevational view taken from the cutting side of the saw shown in Fig. 1, Figure 3 is a fragmentary side elevational view of one of the saw blades employed for forming the saw shown in Figs. 1 and 2, Figure 4 is a fragmentary side elevational view of a second-from of saw blade employed in conjunction with the type shown in Fig. 3 for forming the saw, Figure 5 is a fragmentary side elevational view of the handle and saw blade supporting and spacing bars shown in Figs. 1 and 2, Figure 6 is a transverse sectional view taken on line VI—VI of Fig. 1 and shows one means employed for connecting the saw blades and supporting spacer bars shown in Figs. 3, 4 and 5, and Figure 7 is a transverse sectional view showing a modified form of securing means for the saw blades and spacer bars.

In the drawing, wherein for the purpose of illustration is shown a preferred embodiment of this invention, the numeral 5 designates a triangularly-shaped handle portion that is formed integrally with a pair of spaced flat supporting bars 6 which extend in parallelism throughout their length. It is to be understood that these supporting bars 6 are to be formed of any desired length for being connected to the entire length of the saw blades employed for forming the saw. While there has been shown the handle member 5, it is to be understood that any suitable means may be substituted for this handle construction to adapt the saw for being mechanically operated instead of manually operated.

It is intended that three saw blades be employed for forming the saw embodying this invention. The type of saw shown in Fig. 3 is to be duplicated for forming the outer blades 7 and 8, as shown in Fig. 2, while the type of blade illustrated in Fig. 4 is to be used as the intermediate blade 9 which is also clearly illustrated in Fig. 2. These blades and the supporting bars 6 are all provided with suitably spaced apertures 10 which are adapted for receiving fastening means for retaining the various elements in their operative positions. The blade 9 is to be positioned between the supporting bars 6 while the blades 7—8 are to be positioned outwardly of the said bars.

The outer blades designated by the numerals 7 and 8 are formed with raking or clearing teeth 11 which are suitably spaced to provide room for the double cutting teeth 12 which are alternately provided in respect to the said raking or clearing teeth 11. It is clearly illustrated in Fig. 3 that arches 13 are formed between the teeth 11 and 12 and that each pair of cutting teeth 12 are provided with an intermediate arch portion 14 that is of lesser depth than the arches 13.

The intermediate saw blade 9 is provided with raking or clearing teeth 15 that are suitably spaced to provide room for the separate cutting teeth 16 which are formed in pairs and positioned between each adjacent pair of raking or clearing teeth 15. The teeth 15 and the cutting teeth 16 positioned adjacent thereto are provided with substantially flat topped arches 17 while the spaced cutting teeth 16 are provided with similarly-shaped arches 18 that are of equal depth to the arches 17. By closely inspecting Figs. 1, 3 and 4, it will be seen that the teeth 11 and 12 are longer than the teeth 15 and 16. Further, when the blades 7, 8 and 9 are operatively connected to the supporting bars 6, the raking or clearing teeth 15 formed on the blade 9 will be positioned in transverse alinement with a portion of the cutting teeth 12 carried by the outer blades 7 and 8. The cutting teeth 16 formed upon the intermediate blade 9 will be positioned in transverse alinement with the remaining cutting teeth 12 and with the raking or clearing teeth 11.

In Fig. 6 there is shown one means for connecting the supporting bars 6 and the cutting blades 7, 8 and 9. This form of fastener merely consists of a rivet 19 that is positioned within the openings 10 as shown. The modified form of fastener illustrated in Fig. 7 consists of a sleeve 20 which is provided with a threaded bore 21 and an enlarged head having a transverse groove 22 formed therein that is adapted to be engaged by a screw driver or other similar tool. There is further provided a machine screw 23 that is adapted for threadedly engaging the bore 21, as illustrated. It will be seen by this construction that the various elements may be suitably clamped together to bring their adjacent faces flushly into engagement with each other. It will be seen that the opposite heads of the rivets 19 and the heads of the machine screw and sleeve 23 and 20 respectively are countersunk into the blades 7 and 8 for the purpose of preventing the same from projecting beyond the side faces of these blades.

During the cutting operation of this saw, the blades 7 and 8 will form the side walls of the kerf while the intermediate portion of the bottom wall of the kerf will be formed or operated upon by the blade 9. It will be noted that the teeth 15 and 16 formed upon the blade 9 will be operating upon a different plane to the one operated upon by the teeth 11 and 12 forming parts of the side blades 7 and 8. While it is not illustrated in the various figures, it is to be understood that the pairs of cutting teeth 12 and 16 may be formed with their points bent laterally in opposite directions for a purpose well known in the art.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

Having thus described the invention, I claim:—

1. In a saw of the type described, a handle member, a pair of supporting bars formed integrally therewith extending in parallelism throughout their lengths, a saw blade having clearing and cutting teeth positioned between said bars, a saw blade having clearing and cutting teeth of greater length than the teeth formed on the first mentioned blade positioned outwardly of each bar, the clearing and cutting teeth formed on the first mentioned blade being positioned in staggered relation to similar teeth formed on the outwardly positioned blades, and means for securing said blades to said bars.

2. In a saw of the type described, a frame consisting of a pair of supporting bars integrally formed with a handle, a saw blade having clearing and cutting teeth positioned between said bars, said cutting teeth being arranged in pairs and positioned between adjacent clearing teeth, a saw blade having clearing and cutting teeth of greater length than the teeth formed on the first mentioned blade positioned outwardly of each bar, the teeth on the last mentioned blade consisting of double cutting teeth interposed between adjacent clearing teeth, and means for securing the said blades to said bars so that the double cutting teeth on the outer blades each span one cutting and one clearing tooth on the middle blade and the clearing teeth on the outer blade each span one cutting tooth on the middle blade In testimony whereof I affix my signature.

CHARLES MORZSA.